(12) United States Patent
Li et al.

(10) Patent No.: US 11,272,123 B2
(45) Date of Patent: Mar. 8, 2022

(54) MULTI-LENS CAMERA

(71) Applicant: HANGZHOU HIKVISION DIGITAL TECHNOLOGY CO., LTD., Hangzhou (CN)

(72) Inventors: Yang Li, Hangzhou (CN); Caisheng Yan, Hangzhou (CN); Zhiqiang Rong, Hangzhou (CN); Zhan Ye, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/769,978

(22) PCT Filed: Aug. 3, 2018

(86) PCT No.: PCT/CN2018/098580
§ 371 (c)(1),
(2) Date: Jun. 4, 2020

(87) PCT Pub. No.: WO2019/128234
PCT Pub. Date: Jul. 4, 2019

(65) Prior Publication Data
US 2020/0389603 A1 Dec. 10, 2020

(30) Foreign Application Priority Data
Dec. 27, 2017 (CN) .......................... 201711452322.X

(51) Int. Cl.
*H04N 5/247* (2006.01)
*G03B 17/12* (2021.01)
(Continued)

(52) U.S. Cl.
CPC ............. *H04N 5/247* (2013.01); *G03B 17/12* (2013.01); *G03B 17/561* (2013.01); *G03B 37/04* (2013.01); *H04N 5/2252* (2013.01); *G02B 7/02* (2013.01)

(58) Field of Classification Search
None
See application file for complete search history.

(56) References Cited

U.S. PATENT DOCUMENTS

2015/0358538 A1* 12/2015 Donaldson ............. G03B 17/55
348/38
2017/0139309 A1* 5/2017 Axelsson ............. G03B 17/561
2017/0255083 A1 9/2017 Donaldson

FOREIGN PATENT DOCUMENTS

CN 1512810 7/2004
CN 202735674 2/2013
(Continued)

OTHER PUBLICATIONS

Notification to Grant Patent Rights for Invention issued in Corresponding Chinese Application No. 201711452322, dated May 29, 2020 (English Translation provided).
(Continued)

*Primary Examiner* — Talha M Nawaz
(74) *Attorney, Agent, or Firm* — Norton Rose Fulbright US LLP

(57) ABSTRACT

A multi-lens camera is disclosed in the embodiment of the present application. The multi-lens camera includes a main casing assembly, lenses, a lens regulator, a supporting mechanism and a transparent cover; wherein the transparent cover is mounted on the main casing assembly, and the lens regulator is mounted within a space formed by the main casing assembly and the transparent cover; the transparent cover includes a flat portion and a curved portion surrounding the flat portion; the lens regulator includes a fixing disc
(Continued)

and at least two lens brackets, and each of the lens brackets includes a first bracket for mounting a lens; the first bracket is movably arranged on the fixing disc and is movable along the circumferential direction of the fixing disc. The solution described above can solve the problem of the transparent cover of the multi-lens camera having poor resistance to deformation as described in the background.

19 Claims, 5 Drawing Sheets

(51) Int. Cl.
  *G03B 17/56* (2021.01)
  *G03B 37/04* (2021.01)
  *H04N 5/225* (2006.01)
  *G02B 7/02* (2021.01)

(56) References Cited

FOREIGN PATENT DOCUMENTS

| CN | 203708382 | 7/2014 |
| CN | 104880211 | 9/2015 |
| CN | 104977776 | 10/2015 |
| CN | 106641629 | 5/2017 |
| CN | 207573492 | 7/2018 |
| CN | 207573503 | 7/2018 |
| EP | 2887328 | 6/2015 |
| EP | 3168819 | 5/2017 |
| JP | 2011124622 | 6/2011 |
| WO | WO 2004/095386 | 11/2004 |

OTHER PUBLICATIONS

International Search Report and Written Opinion issued in corresponding PCT Application No. PCT/CN2018/098580, dated Oct. 26, 2018 (English Translation of International Search Report provided).
Extended European Search Report issued in Corresponding European Application No. 18896148.6, dated Jan. 21, 2021.

* cited by examiner

MULTI-LENS CAMERA

CROSS REFERENCE TO RELATED APPLICATIONS

The present application is a national phase application under 35 U.S.C. § 371 of International Application No. PCT/CN2018/098580, filed Aug. 3, 2018, which claims the benefit of priority to Chinese Patent Application No. 201711452322.X, filed with the China National Intellectual Property Administration on Dec. 27, 2017 and entitled "multi-lens camera", each of which are incorporated into the present application by reference in their entirety.

TECHNICAL FIELD

The present application relates to a technical field of camera design, and in particular to a multi-lens camera.

BACKGROUND

A multi-lens camera, as typically used for image acquisition, has a plurality of lenses distributed on the camera body along the circumference thereof. Each of the lenses can be independently subjected to a three-axis adjustment so as to acquire images with a wide angle or a specific angle. Images captured by the plurality of lenses can constitute a panoramic image for the multi-lens camera.

A multi-lens camera usually includes a transparent cover, which is arranged on the plurality of lenses for better protection to prevent damage to the lenses during use. However, the multi-lens camera will be subjected to an external impact in the actual working process which may cause deformation and damage of the transparent cover, or cause the lenses to be pressed and damaged due to deformation of the transparent cover. In order to improve the deformation resistance of a transparent cover, the transparent cover with a specific structure includes a flat portion and a curved portion surrounding the flat portion, and the plurality of lenses are located in a protective space corresponding to the curved portion, and the curved portion can improve the resistance to deformation.

However, the above-mentioned transparent cover will still undergo large deformation when the flat portion is subjected to an external impact, which in turn will easily cause the lens to be damaged by the curved portion. Obviously, the transparent cover of the above-mentioned multi-lens camera still has a problem of having poor resistance to deformation.

SUMMARY

An embodiment of the present application provides a multi-lens camera to solve the problem of the transparent cover of a multi-lens camera having poor resistance to deformation.

The embodiment of the present application provides a multi-lens camera including a main casing assembly, lenses, a lens regulator, a supporting mechanism and a transparent cover, wherein the transparent cover is mounted on the main casing assembly, and the lens regulator is mounted within a space formed by the main casing assembly and the transparent cover; the transparent cover includes a flat portion and a curved portion surrounding the flat portion; the lens regulator includes a fixing disc and at least two lens brackets, and each of the lens brackets includes a first bracket for mounting a lens; the first bracket is movably arranged on the fixing disc and movable along the circumferential direction of the fixing disc; one end of the supporting mechanism is in supporting contact with the main casing assembly, and the other end thereof passes through the fixing disc and is in supporting contact with the flat portion; the supporting mechanism, the curved portion and the main casing assembly constitute a lens accommodating space within which the lenses are located.

In the multi-lens camera as disclosed in the embodiment of the present application, the transparent cover is mounted on the main casing assembly, and includes a flat portion and a curved portion, one end of the supporting mechanism is in supporting contact with the main casing assembly, and the other end thereof is in supporting contact with the flat portion so as to support the transparent cover. Under the support of the supporting mechanism, the transparent cover will be less deformed when subjected to external forces. It can be seen that the multi-lens camera disclosed in the embodiment of the present application can solve the problem of the transparent cover of the multi-lens camera having poor resistance to deformation.

In addition, in the current common multi-lens camera, the lenses are fixed on the mounting disc through the lens brackets. During P-direction adjustment, the mounting disc can rotate relative to the body, and thus the lenses can be rotated in a direction parallel to the mounting disc, that is, the P-direction adjustment is achieved. When the lenses are adjusted in place, the mounting disc will be locked with respect to the body by fastening screws or magnets, so as to keep the lenses in the adjusted positions. Locking the mounting disc with fastening screws requires frequent loosening and fastening operations, which has problems of a cumbersome operation and a low operation efficiency.

In the multi-lens camera disclosed in the embodiment of the present application, the lens bracket of the lens regulator includes a first bracket, which can drive a lens to move along the circumferential direction of a fixing disc, thus realizing P-direction adjustment. During the movement, first tooth slots are engaged with the first meshing teeth to achieve the positioning and movement of the first bracket, which makes the P-direction adjustment of the lens easier.

BRIEF DESCRIPTION OF THE DRAWINGS

In order to illustrate the technical solutions of the embodiments of the present application or of the prior art more clearly, the drawings used in the embodiments or in the prior art will be briefly described below. Obviously, the drawings described below are just some embodiments of the present application and other drawings may be obtained by those skilled in the art based on these drawings without any creative effort.

DESCRIPTION OF REFERENCE SIGNS

Figure 1:
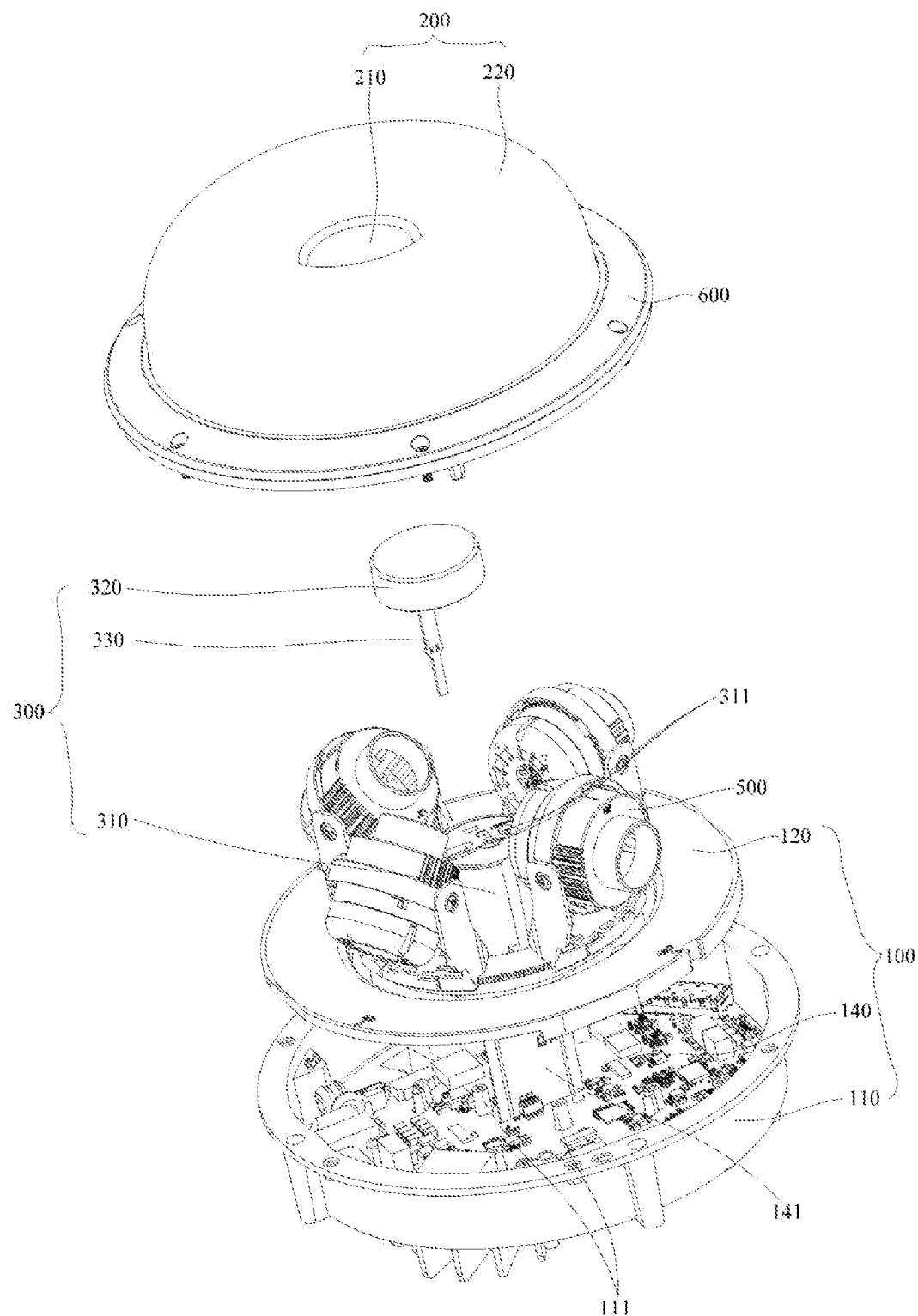
FIG. 1 is an exploded schematic structural view of a multi-lens camera disclosed by an embodiment of the present application.

100—main casing assembly; 110—main casing; 111—fixing post; 111*a*—threaded hole; 120—inner baffle;

121—connection hole; 130—mainboard cavity; 140—mainboard; 141—PCB board;
200—transparent cover; 210—flat portion; 220—curved portion; 221—annular edge;
300—supporting mechanism; 310—supporting body; 311—interface; 320—elastic pad;
330—anti-dropping belt; 331—elastic protrusion; 332—deformation hole;
400—lens accommodating space;
500—lens;
600—pressing cover; 610—cover body; 620—connection portion; 630—pressing portion;
700—press ring;
800—seal;
900—lens regulator; 910—fixing disc; 911—first tooth slots; 912—avoidance hole; 920—lens bracket; 921—first bracket; 9211—elastic connection portion; 9211a—first meshing teeth; 9212—connection base; 9212a—first tightening protrusion; 9212b—second elastic arm; 9213—first catch; 922—second bracket.

DETAILED DESCRIPTION

In order to make the objectives, technical solutions and advantages of the present application clearer, the present application will be described clearly and completely below with reference to the drawings and embodiments. Obviously, the described embodiments are merely a part of rather than all of the embodiments of the present application. All other embodiments obtained by those skilled in the art based on the embodiments of the present application without any creative effort fall within the scope of protection of the present application.

Technical solutions provided by various embodiments of the present application will be described in detail below with reference to the drawings.

Referring to FIGS. 1-7, an embodiment of the present application discloses a multi-lens camera, which includes a main casing assembly 100, a transparent cover 200, a supporting mechanism 300, lenses 500 and a lens regulator 900.

The main casing assembly 100 is the main body portion of the multi-lens camera and is a mounting base for the transparent cover 200. The main casing assembly 100 typically includes a plurality of components. The main casing assembly 100 provides a mounting base or accommodating space for other components of the multi-lens camera. The transparent cover 200 is mounted on the main casing assembly 100 to further realize the mounting. Generally, the transparent cover 200 is fixed on the main casing assembly 100.

The transparent cover 200 includes a flat portion 210 and a curved portion 220. The curved portion 220 is arranged around the flat portion 210. In a specific solution, the flat portion 210 is located at the center of the transparent cover 200, and the curved portion 220 is distributed around the flat portion 210.

The lens regulator 900 is mounted within a space formed by the main casing assembly 100 and the transparent cover 200. Wherein the lens regulator 900 includes a fixing disc 910 and at least two lens brackets 920, and the fixing disc 900 is a mounting base for the lens brackets 920 and the lenses 500. A lens 500 is arranged on the fixing disc through a lens bracket 920.

The lens bracket 920 includes a first bracket 921 for mounting a lens 500. The first bracket 921 is movably arranged on the fixing disc 910 and is movable along a circular edge of the fixing disc 910. The movement of the first bracket 921 will drive the lens 500 to move, so as to adjust the position of the lens 500 on the fixing disc 910.

A supporting mechanism 300 is arranged between the main casing assembly 100 and the flat portion 210. One end of the supporting mechanism 300 is in supporting contact with the main casing assembly 100, and the other end of the supporting mechanism 300 passes through the fixing disc 910 and is in supporting contact with the flat portion 200. The supporting mechanism 300, the curved portion 220 and the flat portion 210 constitute a lens accommodating space 400 that is used to accommodate the lenses 500. When the curved portion 220 is arranged around the flat portion 210 as a center, the lens accommodating space 400 is an annular space.

In the multi-lens camera disclosed in the embodiment of the application, the transparent cover 200 is mounted on the main casing assembly 100 and includes a flat portion 210 and a curved portion 220. One end of the supporting mechanism 300 is in supporting contact with the main casing assembly 100, and the other end of the supporting mechanism is in supporting contact with the flat portion 200 so as to support the transparent cover 200. Under the support of the supporting mechanism 300, the transparent cover 200 will be less deformed when subjected to an external force. It can be seen that the multi-lens camera disclosed in the embodiment of the present application can solve the problem of the transparent cover of a multi-lens camera having poor resistance to deformation described in the background. At the same time, in the multi-lens camera disclosed in the embodiment of the present application, the lens regulator 900 is arranged within the space formed by the transparent cover 200 and the main casing assembly 100. The lens bracket 920 includes a first bracket 921, which is movable along the circumferential direction of the fixing disc 910 to drive the lens 500 to move so as to realize P-direction adjustment. That is, the lens 500 is driven to move in a plane parallel to a disc surface of the fixing disc 910.

There are various types of structures for the supporting mechanism 300. In a specific embodiment, the supporting mechanism 300 may include a supporting body 310 and an elastic pad 320. One end of the supporting body 310 may be fixed on the main casing assembly 100, the other end thereof passes through the fixing disc 910. The elastic pad 320 is supported between the other end of the supporting body 310 and the flat portion 210. The supporting body 310 is a main supporting member, and is supported on the flat portion 210 via the elastic pad 320. The elastic pad 320 can ensure that the supporting mechanism 300 is in elastic contact with the transparent cover 200, and avoid the rigid contact between the transparent cover 200 and the supporting body 310 when the transparent cover is impacted, and thus can further reduce the probability of the transparent cover 200 being broken. As described above, the main casing assembly 100 generally includes a plurality of components, and one end of the supporting body 310 may be fixedly connected with at least one of the plurality of components included in the main casing assembly 100, and thus be fixedly connected with the main casing assembly 100.

The elastic pad 320 may be sleeved on the other end of the supporting body 310. In general, the elastic pad 320 and the supporting body 310 are distributed one above the other during the mounting process. That is, the supporting body 310 is located above the elastic pad 320. The operator assembles the transparent cover 200 after mounting the elastic pad 320 on the supporting body 310. The elastic pad 320 may be sleeved on the outer side of the supporting body 310 or may be sleeved on the inner side of the supporting body 310.

In a preferred solution, in order to prevent the elastic pad 320 from dropping, an anti-dropping belt 330 may be connected between the elastic pad 320 and the supporting body 310.

Referring again to FIG. 1 and FIG. 4, in a specific embodiment, the anti-dropping belt 330 may be an elastic belt, and elastic protrusions 331 may be provided on the edges of both sides in the middle of the anti-dropping belt 330. The anti-dropping belt 330 can be clamped in the connection hole in the supporting body 310 through the elastic protrusions 331, so as to realize the connection. In order to make the elastic protrusions 331 easier to be deformed, a deformation hole 332 may be provided in the middle of the anti-dropping belt 330. When the elastic protrusion 331 is pressed, the deformation hole 332 will be deformed, so that the elastic protrusion 331 is more easily deformed and clamped in the connection hole.

In the embodiment of the present application, the main casing assembly 100 may include a main casing 110 and an inner baffle 120 arranged at a top opening of the main casing 110. A mainboard cavity 130 is formed between the inner baffle 120 and the main casing 110, and a mainboard 140 is arranged within the mainboard cavity 130. In the embodiment of the present application, the mainboard 140 is a main working circuit of the multi-lens camera. The supporting mechanism 300 is arranged between the inner baffle 120 and the flat portion 210. The above structure can realize the arrangement of the mainboard 140, and at the same time can better realize the arrangement of the supporting mechanism 300.

Referring again to FIG. 2 and FIG. 3, in the embodiment of the present application, the supporting body 310 may be a cylinder, having one end as an open end and the other end as a closed end. Of course, it should be noted that in the case where the other end of the supporting body 310 is closed, the elastic pad 320 can only be sleeved on the outside of the other end of the supporting body 310. The inner baffle 120 may be provided with a through hole. The open end is fixed on the inner baffle 120, and may be communicated with the mainboard cavity 130 through the through hole.

Referring again to FIG. 1, the mainboard 140 may include a PCB board 141, which may pass through the through hole and the open end successively from the mainboard cavity 130 and extend into the inner cavity of the supporting body 310. The supporting body 310 with the above structure can accommodate the PCB board 141 of the mainboard 140, and can thereby improve the structural compactness for the multi-lens camera.

In the preferred solution, the closed end of the supporting body 310 may be provided with an interface 311 that can be connected with the PCB board 141. The connection with electronic components on the PCB board 141 through the interface 311 can be used by a user to realize the control or data transmission. Based on this, the elastic pad 320 may be detachably mounted at the closed end, and can be removed by an operator to expose the interface 311 during the operation or output transmission. In a preferred solution, the elastic pad 320 may be detachably and sealingly mounted at the closed end of the supporting body 310 in order to improve the water-proof and dust-proof effects.

Referring again to FIG. 2 and FIG. 3, the main casing 110 has a bottom wall opposite to the supporting body 310, and may be provided with a fixing post 111 that is supported between the bottom wall of the main casing 110 and the supporting body 310. In the preferred solution, there may be a plurality of fixing posts 111. The plurality of fixing post 111 may be arranged dispersedly, and may be fixedly connected to the supporting body 310 through screws. Of course, the plurality of fixing posts 111 may be fixedly connected to the supporting body 310 through other fasteners, which are not limited to the screws, and the types of fasteners are not limited in the embodiment of the present application. Specifically, a threaded hole 111a may be opened in a fixing post 111, and a connection hole 121 may be opened in the inner baffle 120. A screw passes through the connection hole 121 in the inner baffle 120 and is fixedly connected with the threaded hole 111a.

Referring again to FIG. 2, the transparent cover 200 may be fixed on the main casing assembly 100 in various manners. In a specific embodiment, the transparent cover 200 is fixed on the main casing assembly 100 through a pressing cover 600 and a press ring 700; wherein the transparent cover 200 has an annular edge 221 extending outwards, and the pressing cover 600 is fixed on the main casing assembly 100. The press ring 700 is clamped between the main casing assembly 100 and the pressing cover 600, and the annular edge 221 is clamped between the pressing cover 600 and the press ring 700. The above-mentioned method of fixing the transparent cover 200 by clamping can avoid opening the connection hole in the transparent cover 200, and can thus better ensure the overall strength of the transparent cover 200. The pressing cover 600 and the press ring 700 may be fixedly connected to the main casing 110 through a threaded connection.

Figure 2:
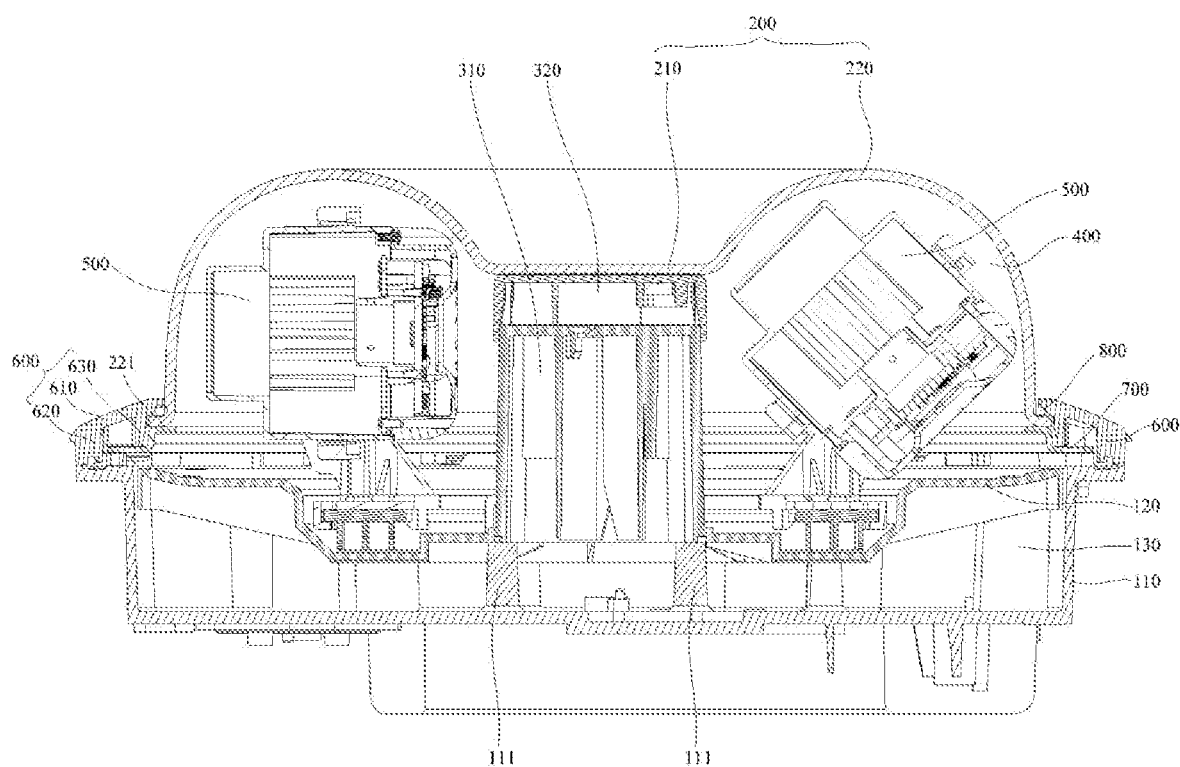
FIG. 2 is a cross-sectional view of a partial structure of a multi-lens camera disclosed by an embodiment of the present application.

In a preferred solution, the pressing cover 600 may be an annular member, and the press ring 700 may be an annular sheet metal member which has a better strength and a better heat dissipation performance. Seals may be arranged between the pressing cover 600 and the annular edge 221 and between the pressing cover 600 and the main casing assembly 100. The seals are fixed with the fixing of the pressing cover 600, the press ring 700 and the transparent cover 200. The arrangement of the above-mentioned seals can ensure a better sealing performance of the multi-lens camera, such that the multi-lens camera has a higher level of waterproof, dustproof and explosion-proof. As shown in FIG. 2, a seal 800 is arranged between the pressing cover 600 and the annular edge 221.

Referring again to FIG. 2, in the embodiment of the present application, the pressing cover 600 includes a cover body 610, and a connection portion 620 and a pressing portion 630 that are arranged on the cover body 610. The connection portion 620 is fixedly connected to the edge of the main casing 110. A pressing space is formed between the cover body 610 and the edge of the main casing 110, and the press ring 700 is clamped between the pressing portion 630 and the edge of main casing 110. Specifically, the pressing portion 630 may be a protrusion extending outwards from the cover body 610. In the pressing cover 600 with the above structure, the connection portion 620 is fixed to the edge of the main casing 110, and the pressing portion 630 presses the press ring 700, thereby realizing the mounting of the press ring 700.

In the embodiment of the present application, one of the first bracket 921 and the fixing disc 910 is provided with first tooth slots, and the other one of them is provided with first meshing teeth, and the first tooth slots are engaged with the first meshing teeth. The first bracket 921 is connected to the fixing disc 910 through the engagement between the first tooth slots and the first meshing teeth.

In the lens regulator 900 disclosed in the embodiment of the present application, a lens 500 is mounted on a first bracket 921, and can then move on the fixing disc 910 together with the first bracket 921, thereby adjusting the position of the lens 500 on the fixing disc 910. The first bracket 921 is connected to the fixing disc 910 through the engagement between the first tooth slots and the first meshing teeth. The operator can drive the first bracket 921 to move by applying a certain force during the adjustment. The first tooth slots and the first meshing teeth move relative to each other during the movement of the first bracket 921. After the adjustment is completed (the external force is removed), the engagement between the first tooth slots and the first meshing teeth can ensure that the first bracket 921 is positioned at the adjusted position, and finally the adjustment of the lens 500 is completed.

In a specific embodiment, the circular edge of the fixing disc 910 is partially or entirely provided with the first tooth slots 911, and correspondingly, the first bracket 921 is provided with the first meshing teeth 9211a. The first bracket 921 can move along the circumferential direction of the fixing disc 910, and thus can rotate along the circumferential direction of the fixing disc 910. The rotation of the first bracket 921 drives the lens 500 to rotate, and can thereby adjust the position of the lens 500 on the fixing disc 910. The position adjustment is performed in a disc surface parallel to the fixing disc 910, which is the P-direction adjustment of the lens 500. Of course, the first tooth slots 911 may be arranged on the first bracket 921, and correspondingly, the first meshing teeth 9211a are arranged on the fixing disc 910.

The first bracket 921 may include an elastic connection portion 9211. The elastic connection portion 9211 may be provided with the first meshing teeth 9211a that are engaged with the first tooth slots 911. It should be noted that in the embodiment of the present application, the engagement between the first tooth slots and the first meshing teeth means that they are fixed to each other without any relative movement therebetween when no external force is present. When the first tooth slots or the first meshing teeth are elastically deformed due to an external force, they are disengaged, and thru the first tooth slots and the second meshing teeth can move relative to each other. The first bracket 921 can thus move along the circumferential direction of the fixing disc 910, that is, the first bracket 921 can rotate along the circumferential direction of the fixing disc 910.

The elasticity of the elastic connection portion 9211 ensures a better flexibility in the engagement between the first tooth slots 911 and the first meshing teeth 9211a. Under the action of an external force, the elastic connection portion 9211 will be deformed elastically, thus the first meshing teeth 9211a and the first tooth slots 911 are disengaged, so that they can rotate relative to each other.

The rotation of the first bracket 921 along the circumferential direction of the fixing disc 910 can be implemented in various manners. The first bracket 921 may be rolled along the circumferential direction of the fixing disc 910 so as to rotate, and the first bracket 921 may also slide along the circumferential direction of the fixing disc 910 so as to rotate.

In a specific embodiment, an annular slideway may be provided on the fixing disc 910. The first bracket 921 is in a positioning engagement with the annular slideway in a direction perpendicular to the disc surface of the fixing disc 910, and the first bracket 921 is slidably engaged with the fixing disc 910 in the circumferential direction of the fixing disc 910. The positioning engagement of the first bracket 921 with the annular slideway in the direction perpendicular to the disc surface of the fixing disc means that the first bracket 921 cannot move relative to the fixing disc 810 in a direction perpendicular to the disc surface, and can only move along the circumferential direction of the fixing disc 910, so as to realize the rotation. Herein, The positioning engagement of the first bracket 921 with the annular slideway in the direction perpendicular to the disc surface of the fixing disc 910 means that the first bracket 921 cannot move relative to the fixing disc 910 in a direction perpendicular to the disc surface of the fixing disc 910.

The annular slideway can be formed on the fixing disc 910 in various manners. For example, the annular slideway is formed on the disc surface of the fixing disc 910. Referring again to FIG. 1, an avoidance hole 912 is provided in the center of the fixing disc 910. Specifically, the avoidance hole 912 may penetrate the fixing disc 910. The formation of the avoidance hole 912 makes the entire fixing disc 910 to be an annular structural member which may be used as an annular slideway; the first bracket 921 moves along the annular structural member, such that the first bracket 921 can rotate in the circumferential direction of the fixing disc 910.

Referring again to FIG. 4-7, the first bracket 921 may include a connection base 9212 and a first catch 9213. The connection base 9212 is attached on a side surface of the fixing disc 910, the first catch 9213 is fixedly connected to the connection base 9212 and passes through the avoidance hole 912 to clamp the fixing disc 910. The connection base 9212 and the first catch 9213 are engaged with the two side surfaces of the fixing disc 910 respectively, so that the first bracket 921 can be assembled on the fixing disc 910. During the rotation of the first bracket 921 in the circumferential direction of the fixing disc 910, the connection base 9212 can slide relative to one side surface of the fixing disc 910. Similarly, the first catch 9213 can slide relative to the other side surface of the fixing disc 910.

The elastic connection portion 9211 may be a part of the connection base 9212 or the first catch 9213, and may also be separate from the connection base 9212 and the first catch 9213.

In a specific embodiment, the first bracket 921 may include a connection base 9212 and an elastic connection portion 9211. The elastic connection portion 9211 is a first elastic arm, having one end fixed on the connection base 9212 and the other end as a free end. The free end of the first elastic arm may be located outside the circular edge of the fixing disc 910. The free end of the first elastic arm can be elastically deformed relative to the connection base 9212, so as to be disengaged therefrom to realize the relative rotation between the first bracket 921 and the fixing disc 910.

Figure 3:
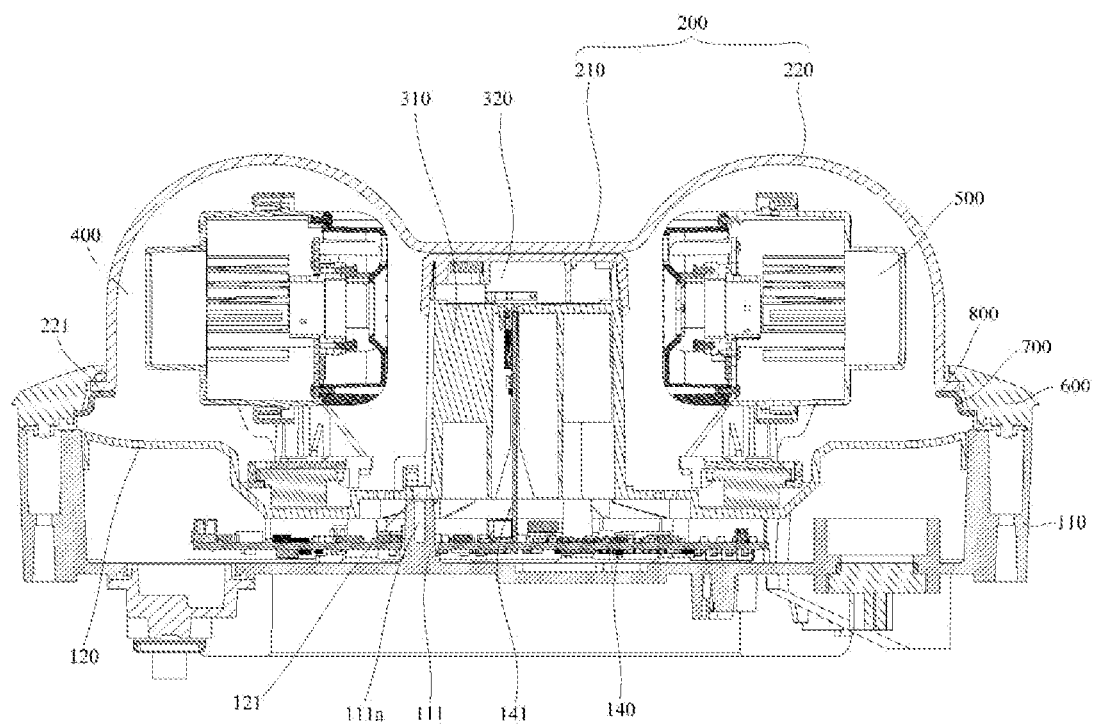
FIG. 3 is a cross-sectional view of a partial structure of a multi-lens camera disclosed by an embodiment of the present application.
Figure 4:
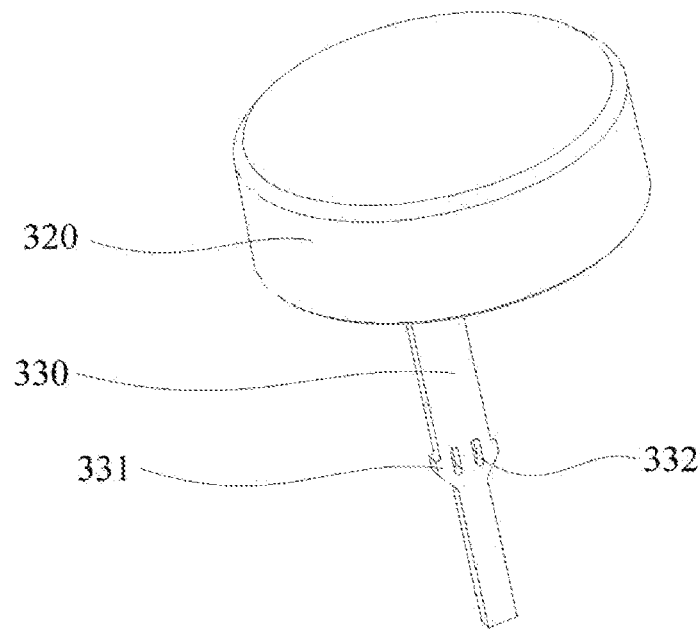
FIG. 4 is an enlarged schematic structural view of the partial structure in FIG. 1.
Figure 5:
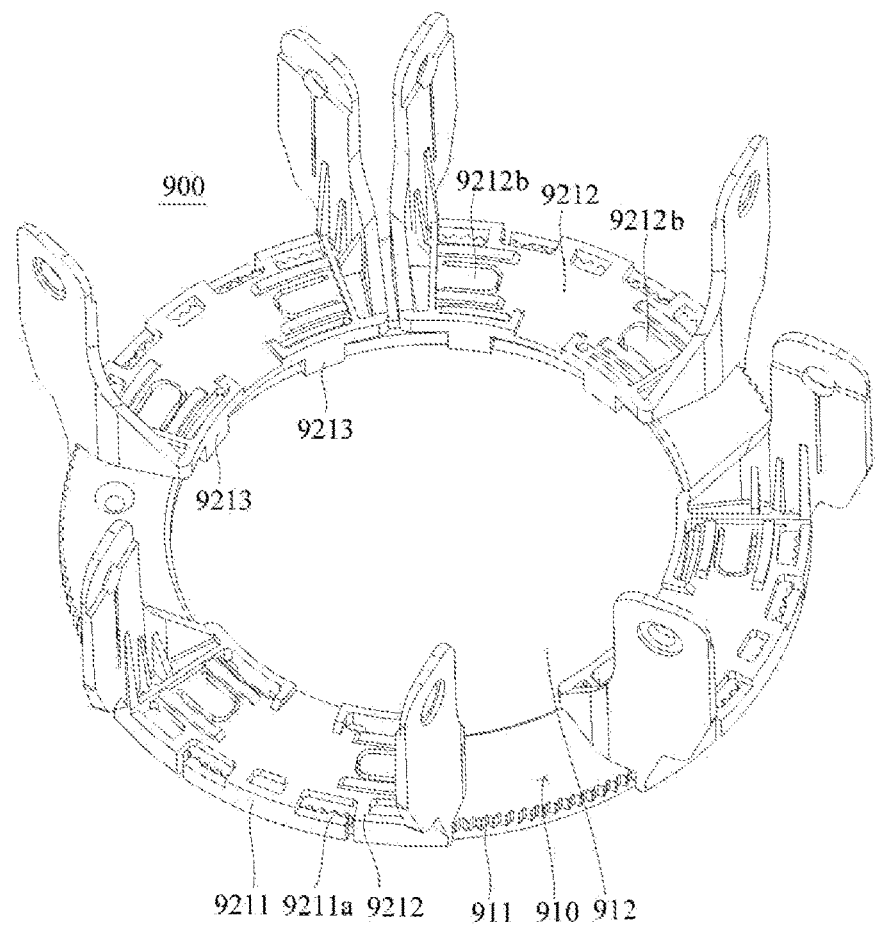
FIG. 5 is a schematic structural view of a lens regulator of a multi-lens camera disclosed by an embodiment of the present application.
Figure 6:
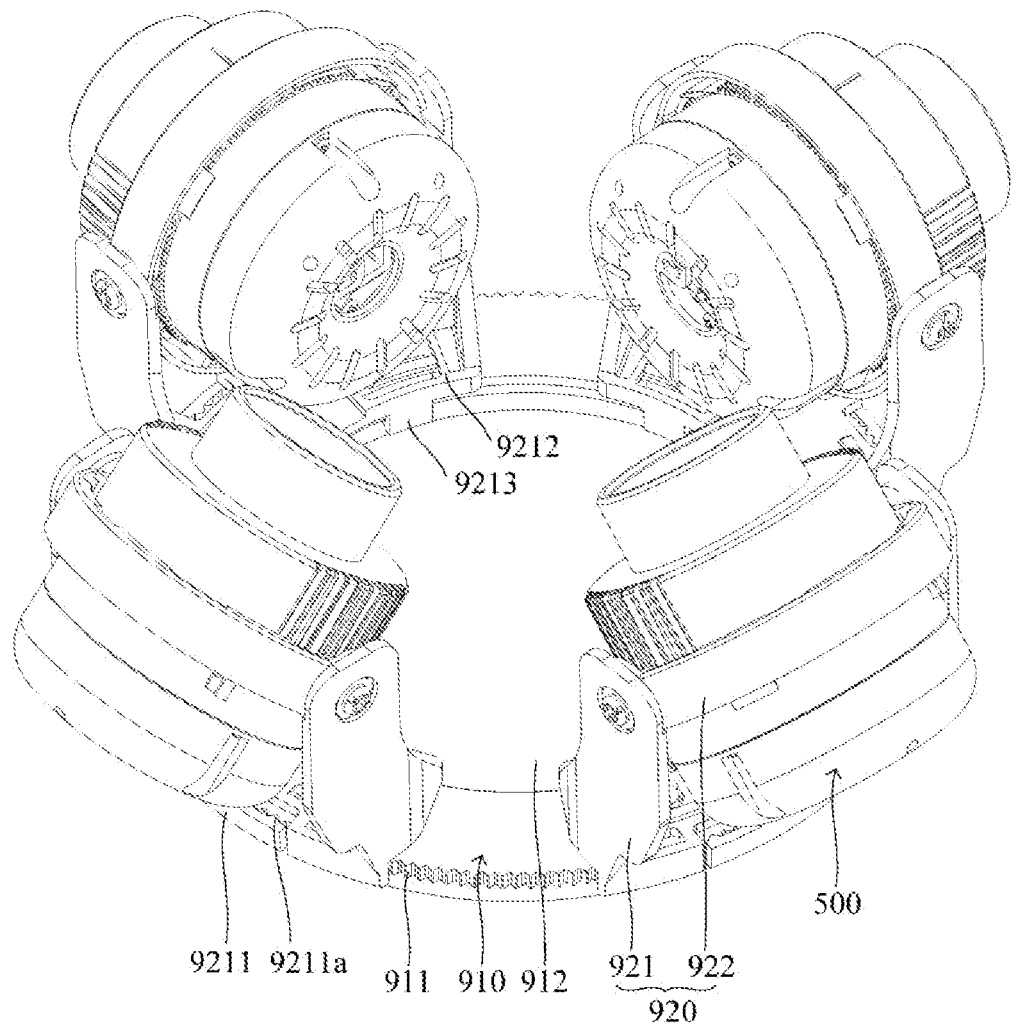
FIG. 6 is a schematic structural view of a lens regulator installed with lenses.
Figure 7:
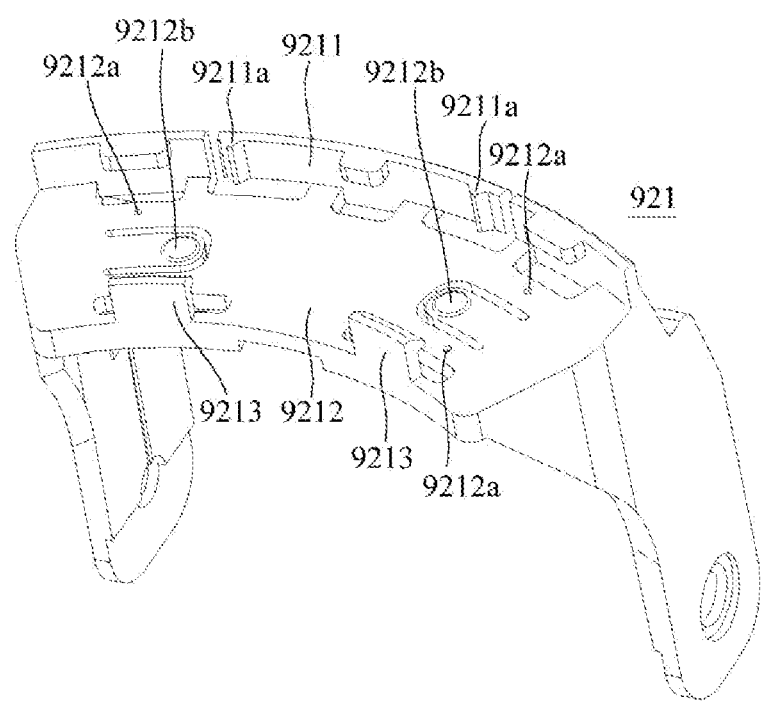
FIG. 7 is a schematic structural view of a first bracket.

In order to ensure that the first bracket 921 does not rotate when it is not subjected to an external force or is subject to a small disturbance force, in a preferred solution, at least one of the first bracket 921 and the fixing disc 910 is provided with a tightening portion that can be tightly attached to the other one of the first bracket and the fixing disc. Referring to FIG. 3, the tightening portion may include a first tightening protrusion 9212a and/or a second elastic arm 9212b. In a preferred solution, the first bracket 921 includes a connection base 9212. The connection base 9212 is attached to the disc surface of the fixing disc 810, and has a bottom surface that is attached to the fixing disc 910. The bottom surface may be provided with the first tightening protrusion 9212a and the second elastic arm 9212b that together enable tightening attachment between the first bracket 921 and the fixing disc 910.

Referring again to FIG. 2, in the embodiment of the present application, there may be plurality of lens brackets 920, and the plurality of lens brackets 920 may be distributed along the circumferential direction of the fixing disc 910. Specifically, the plurality of lens brackets 920 may be dispersedly arranged along the circumferential direction of the fixing disc 910.

Referring again to FIG. 6, in the lens regulator 900 disclosed in the embodiment of the present application, a lens bracket 920 may further include a second bracket 922 that is arranged on the first bracket 921. The second bracket 922 can be rotatably engaged with the lens 500 such that the lens 500 can rotate about its own axis, so as to achieve the purpose of adjusting the lens 500, i.e., in R-direction.

Herein, the technical features in the various preferred solutions can be combined to obtain a solution as long as no confliction occurs, and all of these solutions fall within the scope disclosed in the present application.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments.

The embodiments described above are simply preferable embodiments of the present application, and are not intended to limit the present application. Any modifications, alternatives, improvements, or the like within the spirit and principle of the present application shall be included within the scope of protection of the present application.

What is claimed is:

1. A multi-lens camera, comprising a main casing assembly, lenses, a lens regulator, a supporting mechanism and a transparent cover; wherein the transparent cover is mounted on the main casing assembly, and the lens regulator is mounted within a space formed by the main casing assembly and the transparent cover; the transparent cover comprises a flat portion and a curved portion surrounding the flat portion; the lens regulator comprises a fixing disc and at least two lens brackets, each of the lens brackets comprises a first bracket for mounting a lens; the first bracket is movably arranged on the fixing disc and is movable along a circumferential direction of the fixing disc; one end of the supporting mechanism is in supporting contact with the main casing assembly, and the other end of the supporting mechanism passes through the fixing disc and is in supporting contact with the flat portion; the supporting mechanism, the curved portion and the main casing assembly constitute a lens accommodating space within which the lenses are located;
wherein, an annular slideway is provided on the fixing disc, the first bracket is in a positioning engagement with the annular slideway in a direction perpendicular to the fixing disc and is movable in the circumferential direction of the fixing disc; and
wherein, an avoidance hole is provided in a center of the fixing disc, and the other end of the supporting mechanism passes through the avoidance hole.

2. The multi-lens camera of claim 1, wherein, the supporting mechanism comprises a supporting body and an elastic pad, one end of the supporting body is fixed on the main casing assembly, and the elastic pad is supported between the other end of the supporting body and the flat portion.

3. The multi-lens camera of claim 2, wherein, the elastic pad is sleeved on the other end of the supporting body, and an anti-dropping belt is connected between the supporting body and the elastic pad;
wherein, the elastic pad is sleeved outside the other end of the supporting body.

4. The multi-lens camera of claim 2, wherein, the main casing assembly comprises a main casing and an inner baffle arranged at a top opening of the main casing, and a mainboard cavity is formed between the inner baffle and the main casing; a mainboard is arranged within the mainboard cavity, and the supporting mechanism is arranged between the inner baffle and the flat portion.

5. The multi-lens camera of claim 4, wherein, the supporting body is a cylinder, having one end as an open end and the other end as a closed end; the open end is fixed on the inner baffle provided with a through hole, and is communicated with the mainboard cavity through the through hole.

6. The multi-lens camera of claim 5, wherein, the mainboard comprises a PCB board that passes through the through hole and the open end successively from the mainboard cavity and extends into an inner cavity of the supporting body.

7. The multi-lens camera of claim 6, wherein, the closed end of the supporting body is provided with an interface that is connected to the PCB board, and the elastic pad is detachably and sealingly mounted at the closed end.

8. The multi-lens camera of claim 1, wherein, one of the fixing disc and the first bracket is provided with first tooth slots, the other one of the fixing disc and the first bracket is provided with first meshing teeth, and the first bracket is connected to the fixing disc through an engagement between the first tooth slots and the first meshing teeth.

9. The multi-lens camera of claim 8, wherein, a circular edge of the fixing disc is partially or entirely provided with the first tooth slots, the first bracket is provided with the first meshing teeth, and is movable along the circumferential direction of the fixing disc.

10. The multi-lens camera of claim 9, wherein, the first bracket comprises an elastic connection portion, wherein the elastic connection portion is provided with the first meshing teeth that are elastically engaged with the first tooth slots.

11. The multi-lens camera of claim 10, wherein, the first bracket comprises a connection base and the elastic connection portion, and the elastic connection portion is a first elastic arm, having one end fixed on the connection base and the other end as a free end located outside the circular edge.

12. The multi-lens camera of claim 1, wherein, the first bracket comprises a connection base and a first catch, wherein the connection base is attached on a side surface of the fixing disc, and the first catch is fixedly connected to the connection base and passes through the avoidance hole to clamp the fixing disc.

13. The multi-lens camera of claim 1, wherein, at least one of the first bracket and the fixing disc is provided with a tightening portion that can be tightly attached to the other one of the first bracket and the fixing disc;

wherein, the tightening portion comprises a first tightening protrusion and/or a second elastic arm.

14. The multi-lens camera of claim 13, wherein, the first bracket comprises a connection base, which is attached to a disc surface of the fixing disc and has a bottom surface attached to the fixing disc, and the bottom surface is provided with the first tightening protrusion and the second elastic arm.

15. The multi-lens camera of claim 4, wherein, the main casing has a bottom wall opposite to the supporting body, and is provided with a fixing post that is supported between the bottom wall and the supporting body.

16. The multi-lens camera of claim 15, wherein, there are a plurality of fixing posts, which are dispersedly arranged and fixedly connected to the supporting body by screws.

17. The multi-lens camera of claim 1, wherein, the transparent cover is fixed on the main casing assembly through a pressing cover and a press ring, and has an annular edge extending outwards; wherein the pressing cover is fixed on the main casing assembly, the press ring is clamped between the main casing assembly and the pressing cover, and the annular edge is clamped between the pressing cover and the press ring.

18. The multi-lens camera of claim 17, wherein, seals are arranged between the pressing cover and the annular edge and between the pressing cover and the main casing assembly.

19. The multi-lens camera of claim 17, wherein, the main casing assembly comprises a main casing, the pressing cover comprises a cover body, and a connection portion and a pressing portion which are arranged on the cover body, the connection portion is fixedly connected to an edge of the main casing, and a pressing space is formed between the cover body and the edge of the main casing, and the press ring is clamped between the pressing portion and the edge of the main casing.

* * * * *